US005665819A

United States Patent [19]

Tenzer

[11] Patent Number: 5,665,819

[45] Date of Patent: *Sep. 9, 1997

[54] FERRITE COMPOSITIONS FOR USE IN A MICROWAVE OVEN

[75] Inventor: Rudolf K. Tenzer, Martinsville, N.J.

[73] Assignee: Ceramic Powders, Inc., Joliet, Ill.

[ * ] Notice: The term of this patent shall not extend beyond the expiration date of Pat. No. 5,523,549.

[21] Appl. No.: 590,493

[22] Filed: Jan. 24, 1996

Related U.S. Application Data

[62] Division of Ser. No. 248,599, May 25, 1994, Pat. No. 5,523,549.

[51] Int. Cl.[6] .......... C04B 35/26

[52] U.S. Cl. .......... 252/62.61; 252/62.63; 252/62.64; 252/62.6; 423/594

[58] Field of Search .......... 252/62.61, 62.63, 252/62.64, 62.6; 423/594

[56] References Cited

U.S. PATENT DOCUMENTS

| | | | |
|---|---|---|---|
| 2,565,111 | 8/1951 | Schoenberg | 252/62.61 |
| 2,830,162 | 4/1958 | Copson et al. | 219/10.41 |
| 2,999,275 | 9/1961 | Blume, Jr. | 252/62.59 |
| 3,394,082 | 7/1968 | Hidebrandt et al. | 252/62.61 |
| 3,476,688 | 11/1969 | Friess et al. | 252/62.64 |
| 3,532,630 | 10/1970 | Tenzer | 252/62.59 |
| 3,609,084 | 9/1971 | Loye | 252/62.61 |
| 3,773,669 | 11/1973 | Yamauchi et al. | 252/62.58 |
| 4,266,108 | 5/1981 | Anderson et al. | 252/62.59 |
| 4,267,420 | 5/1981 | Brastad | 219/730 |
| 4,277,356 | 7/1981 | Simonet | 252/62.59 |
| 4,306,133 | 12/1981 | Levinson | 219/730 |
| 4,362,917 | 12/1982 | Freedman et al. | 219/730 |
| 4,496,815 | 1/1985 | Jorgensen | 219/730 |
| 4,598,034 | 7/1986 | Honjo et al. | 252/62.6 |
| 4,640,880 | 2/1987 | Kawanishi et al. | 430/106.6 |
| 4,641,005 | 2/1987 | Seiferth | 219/730 |
| 4,846,987 | 7/1989 | Togane | 252/62.6 |
| 4,849,020 | 7/1989 | Osborne et al. | 106/291.1 |
| 4,948,932 | 8/1990 | Clough | 219/728 |
| 4,977,054 | 12/1990 | Honjo et al. | 430/108 |
| 4,998,001 | 3/1991 | Cigarini et al. | 219/703 |
| 5,057,738 | 10/1991 | Boerekamp | 252/62.61 |
| 5,070,223 | 12/1991 | Colasante | 219/759 |
| 5,204,204 | 4/1993 | Shintani et al. | 430/108 |
| 5,258,254 | 11/1993 | Moriya | 430/106.6 |
| 5,268,546 | 12/1993 | Berg | 219/728 |
| 5,272,038 | 12/1993 | Matsubara et al. | 430/108 |
| 5,285,040 | 2/1994 | Brandberg et al. | 219/745 |
| 5,338,911 | 8/1994 | Brandberg et al. | 219/759 |
| 5,419,994 | 5/1995 | Honjo et al. | 430/106.6 |

FOREIGN PATENT DOCUMENTS

| | | |
|---|---|---|
| 1069879 | 5/1967 | United Kingdom . |
| 1239813 | 7/1971 | United Kingdom . |
| 1333174 | 10/1973 | United Kingdom . |
| 2097639 | 4/1982 | United Kingdom . |

OTHER PUBLICATIONS

Torii et al, "Wider Stable Temperature Range Memory Cores", IEEE Tran. Magn., Vol. Mag-15, No. 6, pp. 1889–1891, Nov. 1979.

*Primary Examiner*—Melissa Bonner
*Attorney, Agent, or Firm*—Dressler, Rockey, Milnamow & Katz, Ltd.

[57] ABSTRACT

A ferrite composition is created by adding a high Curie temperature ferrite, such as lithium ferrite, to a soft magnetic ferrite, such as magnesium manganese zinc ferrite. The composition is used in a microwave oven dish or laminate wrap to crisp or brown food by maintaining the food at a desired temperature during microwave operation. The high Curie temperature ferrite is preferably selected from the group consisting of lithium ferrite, nickel ferrite, copper ferrite, magnesium ferrite, strontium ferrite, barium ferrite, manganese ferrite, strontium zinc ferrite, barium zinc ferrite, and mixtures thereof. Additionally, the preferred process of making the new ferrite composition for use in microwave browning dishes includes the low-cost method of sintering raw materials in an air atmosphere. A browning plate including the ferrite compositions, and a microwave oven suitable for use with the browning plate are also disclosed.

9 Claims, 1 Drawing Sheet

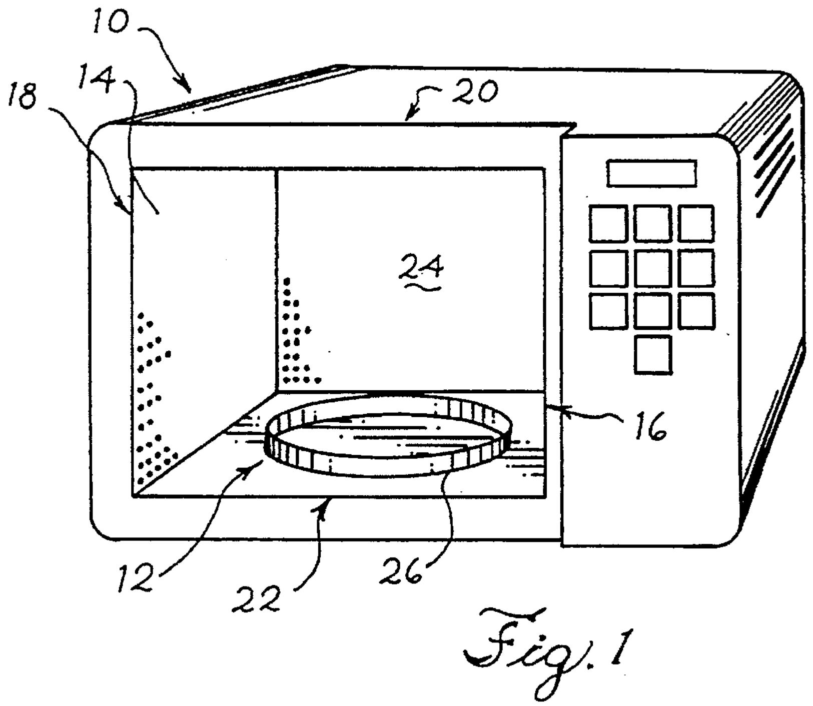
Fig. 1
Fig. 2
Fig. 4
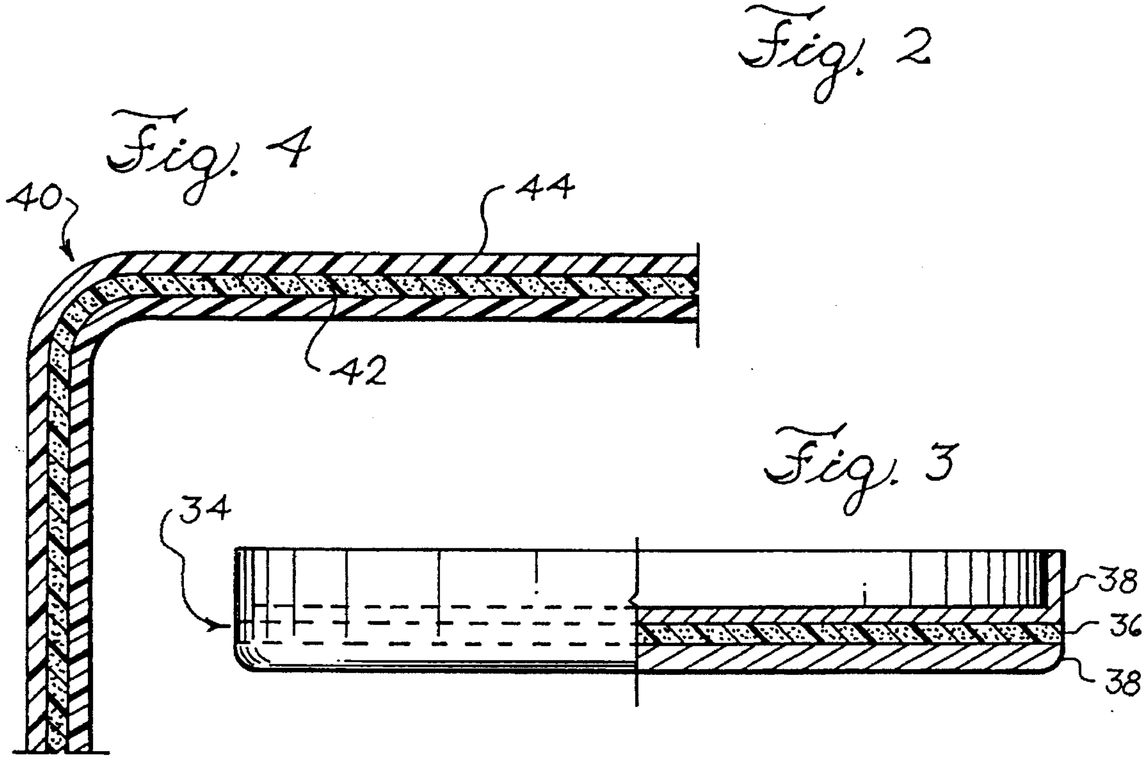
Fig. 3

FERRITE COMPOSITIONS FOR USE IN A MICROWAVE OVEN

This application is a division of application No. 08/248,599, filed May 25, 1994, now U.S. Pat. No. 5,523,549.

BACKGROUND OF THE INVENTION

This invention relates to the field of ferrite compositions used as browning elements in a microwave oven for browning or crisping food. More particularly, the ferrite compositions are used in a microwave oven dish or laminate to maintain the dish or laminate at a desired temperature for browning or crisping food.

Microwave ovens have been popular for many years because they heat food much faster than conventional ovens and consume less energy. However, one of the previous drawbacks for microwave cooking was the difficulty in obtaining a crust or browning food. Recent developments have made significant improvements in this area. Specifically, at least one microwave oven manufacturer now includes reusable crisping/browning elements consisting of ferrite powders embedded in plastic or rubber (see U.S. Pat. No. 5,268,546). Several manufacturers sell a metallic paper throw-away item to wrap food for crisping/browning (see e.g. U.S. Pat. No. 5,285,040).

A ferrite material currently used in reusable microwave browning dishes known as manganese zinc ferrite includes manganese, zinc, and iron oxide. Ferrite powders used for microwave crisping applications such as manganese zinc ferrite are quite expensive. These ferrite powders use a high percentage of costly raw materials such as manganese and zinc oxide. Further, these ferrite powders must be sintered in atmospheres other than air, such as nitrogen atmosphere, to prevent the manganese from converting to a higher valence during the sintering and cooling process. Special atmosphere furnaces cost 40% to 100% more than air furnaces. Also, maintenance for special atmosphere furnaces costs more than maintenance for air furnaces. Additionally, very tight control of temperature, time, and oxygen percentage is required in the process of sintering manganese zinc ferrite to create a material that will crisp food in a microwave oven. Thus, there is a need for a low-cost ferrite material for use in a microwave oven browning device.

SUMMARY OF THE INVENTION

The present invention is directed to a ferrite material that satisfies these needs. The invention relates to a ferrite composition created by adding a high Curie temperature ferrite, such as lithium ferrite, to a soft magnetic ferrite, such as magnesium manganese zinc ferrite, for use in a microwave oven dish or laminate wrap to crisp or brown food by maintaining the food at a desired temperature during microwave operation. The high Curie temperature ferrite is preferably selected from the group consisting of lithium ferrite, nickel ferrite, copper ferrite, magnesium ferrite, strontium ferrite, barium ferrite, manganese ferrite. Strontium zinc ferrite, and barium zinc ferrite in a suitable composition range are usable also. A preferred embodiment of the invention includes a ferrite composition comprising lithium, magnesium, manganese, zinc, and iron oxides known as lithium magnesium manganese zinc ferrite. A preferred range of embodiments comprises ferrite compositions including 1 to 10 mol % of $Li_2O$, 1 to 5 mol % of $Mn_2O_3$, 10 to 30 mol % of MgO, 10 to 30 mol % of ZnO, and 50 to 60 mol % of $Fe_2O_3$. The ferrite compositions may be embedded in plastic or rubber in connection with a microwave browning dish or coupled to a laminate wrap to brown or crisp food during microwave cooking.

Additionally, the invention relates to the process of making the new ferrite compositions for use in microwave browning dishes including the low-cost method of sintering raw materials in an air atmosphere.

This invention is also related to a browning plate including the ferrite compositions. A preferred embodiment of the browning plate preferably includes a heat conducting metal plate having an underside, the underside arranged to be stably and detachably carried by a microwave oven bottom plate. The browning plate preferably includes a layer of ferrite material substantially covering the underside of the browning plate. The ferrite material has a Curie temperature of about 140 to about 400 degrees Celsius that will depend on the specific chemistry chosen. The browning plate is heated substantially by absorption in the layer of ferrite material of inductive field energy from microwaves propagating within a microwave oven cavity.

This invention relates further to a combination of a microwave oven and a browning dish including the ferrite composition. The microwave oven has an oven cavity including a bottom wall, sidewalls, and a roof. The browning dish includes a heat conducting plate having a first side for supporting the food and a second side provided with a layer of ferrite material including the ferrite composition. The preferred ferrite composition includes 3 to 5 mol % $Li_2O$ 2 to 3 mol % $Mn_2O_3$, 18 to 22 mol % MgO, 17 to 20 mol % ZnO, and 52 to 57 mol % of $Fe_2O_3$. Also, the microwave oven includes a spacer for creating a space between the browning dish and the cavity bottom. Further, the microwave oven includes a microwave source for generating microwaves, and a system for directing microwaves from the microwave source into the oven cavity. This system comprises a wave guide device having at least one opening arranged to establish a field concentration of microwaves along the layer of ferrite material for generating magnetic losses therein and thereby heating the heat conducting plate.

In accordance with another aspect of the present invention, the ferrite composition includes the following compositions 1 to 10 mol % of a material selected from the group consisting of $Li_2O$, nickel oxide, copper oxide, strontium oxide, barium oxide, and lithium oxide preferably from 1 to 8 mol % $Li_2O$ and most preferably 2 to 5 mol % $Li_2O$, 1 to 5 mol % of $Mn_2O3$, preferably 1 to 4 mol % of $Mn_2O_3$ and most preferably 2 to 3 mol % $Mn_2O_3$, 10 to 30 mol % of MgO, preferably 15 to 25 mol % MgO and most preferably 18 to 22 mol % MgO, 10 to 30 mol % of ZnO, preferably 15 to 25 mol % ZnO and most preferably 17 to 20 mol % ZnO, and 50 to 60 mol % of $Fe_2O_3$, preferably 52 to 57 mol % $Fe_2O_3$. The Curie temperature of the above described compositions from about 140–400 degrees Celsius and in microwave oven applications varies from about 200 to about 300 degrees Celsius.

An advantage of the present invention is that raw materials for the new ferrite compositions may be economically sintered in an air atmosphere at elevated temperatures, thus avoiding the costly special atmosphere sintering process step used in prior art ferrites for microwave browning and crisping. The ferrite compositions also reduce manufacturing raw material costs since these ferrites include a substantially higher percentage of inexpensive iron oxide than prior art ferrites.

Another advantage of the new ferrite compositions is that the Curie temperature of the composition corresponds to the percentage of the high Curie temperature ferrite, preferably lithium ferrite, used in the composition. Thus, the amount of browning and/or crispness may be adjusted according to the type of food and a consumer's taste. Adjustable crispiness arises from improved quality control as to the desired microwave dish operating temperature and may provide for new microwave crisping and browning products.

A further advantage of the present invention is that a microwave oven browning plate including the new ferrite composition heats up to the desired temperature more quickly than with prior art ferrites, allowing shorter cooking times. Thus, the new ferrite compositions provide improved performance in microwave oven browning dishes and laminates and reduce the raw material cost, the equipment cost, and the overall cost of manufacture.

These and other features, aspects, and advantages of the present invention will become better understood with regard to the following description, appended claims, and accompanying drawings.

BRIEF DESCRIPTION OF THE DRAWINGS

FIG. 1 shows a microwave oven including a browning plate and a layer of ferrite material attached to the bottom of the browning plate;

FIG. 2 shows a silicone rubber housing including a ferrite layer attached to a metal browning plate supporting a food item;

FIG. 3 shows a silicone rubber housing including a ferrite layer, the housing inserted between two layers of metal in the metal browning plate; and FIG. 4 shows a disposable laminate for use in browning food in a microwave oven, the laminate including a plastic film having ferrite particles.

DETAILED DESCRIPTION OF THE DRAWINGS AND PREFERRED EMBODIMENTS OF THE INVENTION

A preferred embodiment of a ferrite composition according to the present invention may be made by combining two or more component ferrites into a single ferrite composition. A first ferrite component comprises a high Curie temperature ferrite material. Examples of high Curie temperature ferrite materials include, but are not limited to, lithium ferrite, nickel ferrite, copper ferrite, magnesium ferrite, strontium ferrite, barium ferrite, manganese ferrite, strontium zinc ferrite, and barium zinc ferrite. A second component comprises a soft ferrite material such as magnesium zinc ferrite or magnesium manganese zinc ferrite.

By varying the ratio of these two ferrite components, a series of ferrite compositions may be developed having pre-selected Curie temperatures covering the entire range of desirable temperatures for cooking foods in a microwave oven. Ferrite compositions created according to the present invention by combining the first and second component ferrites, may be used as temperature control elements for browning or crisping food contained in either disposable or non-disposable items for microwave cooking.

In a first preferred embodiment, a magnesium manganese zinc ferrite may be used as the soft ferrite component and lithium ferrite may be used as the high Curie temperature ferrite component. Magnesium manganese zinc ferrite was chosen since this material may be sintered in air atmosphere. This is advantageous since the prior compositions must be sintered in nitrogen atmosphere, thereby adding to the cost of manufacturing. Lithium ferrite was chosen as the high Curie temperature ferrite since it has a very high Curie temperature of 670 degrees Celsius. Also, the lithium ferrite component preferably contains at least 90 weight % iron oxide. Thus, the preferred composition contains a greater percentage of low-cost iron oxide than prior art microwave oven ferrites, thereby reducing raw material costs.

The process of making a preferred embodiment of a ferrite composition according to the present invention will now be disclosed in detail by way of an example.

EXAMPLE OF THE PREFERRED EMBODIMENT

Start with the following raw materials: iron oxide with a fineness of less than one micron such as Product No. TI5555 manufactured b Magnetic International, Inc., 1111 North State Route 149, Burns Harbor, Ind. 46304; magnesium oxide having a fineness of about 4 microns such as MAGCHEM30 manufactured by Martin Marietta, Magnesia Specialties, Inc., P.O. Box 398, Manistee, Mich. 49660; zinc oxide having a fineness of about 2 microns such as KADOX920 manufactured by Zinc Corp. of America, 1300 Frankfort Road, Monaca, Pa. 15061; manganese dioxide having a granular form such as $MnO_2$-High Purity (HP) manufactured by Chemetals, 711 Pittman Road, Baltimore Md. 21220; and lithium carbonate having granular form such as Product No. 51075 manufactured by Cyprus Foote Minerals Co., 301 Lindenwood Drive, Malvern, Pa. 19355.

In order to obtain a uniform ferrite chemistry, it is necessary to mix all of the raw materials in a finely divided state. The two granular raw materials, manganese dioxide, and lithium carbonate, were first ground to a median particle size of about three microns. A dry ball mill having an 8 inch diameter and a 9 inch length was used to grind the granular raw materials. The granular raw materials were ground for 6 hours using a 50% volume charge of 0.5 inch diameter polished steel balls. The powder charge per batch was 1000 grams. All of the raw materials then had a particle size of about 3 microns or less and were ready to be mixed.

To determine the correct weight percent of each raw material to be mixed, the formulas for lithium ferrite and magnesium manganese zinc ferrite were calculated separately. Lithium ferrite contains about 3.6 weight % lithium oxide and about 96.4 weight % iron oxide. The starting materials for lithium ferrite (lithium carbonate and iron oxide) were weighed out with a higher lithium content than the above formula based on the knowledge that some of the lithium oxide would be lost due to volatilization during the sintering process. Thus, the weight percentages used were 10% lithium carbonate and 90% iron oxide.

The formula used for the magnesium manganese zinc ferrite was about 24 mole % magnesium oxide, about 3.1 mole % manganese oxide, about 22.6 mole % zinc oxide, and about 47.4 mole % iron oxide. This translates into a weight formulation of about 9% magnesium oxide, about 4.5% manganese oxide, about 17% zinc oxide, and about 69.5% iron oxide.

This magnesium manganese zinc ferrite is commonly known to have a Curie temperature of 115 degrees Celsius +/−5 degrees, depending on the exact sintering conditions. Lithium ferrite is known to have a Curie temperature of about 670 degrees Celsius. By systematically varying the ratio of these two ferrites, a series of ferrites can be achieved where the ferrites have a pre-selected Curie temperature between 115 degrees Celsius and 670 degrees Celsius. Table 1 lists the calculated Curie temperatures for various percentages of lithium ferrite and magnesium manganese zinc ferrite as used in this example.

TABLE 1

Calculated C.T. for Various % of Li & Mg Mn Zn Ferrites

| % Li Ferrite | % Mg Mn Zn Ferrite | C.T. (Celsius) |
|---|---|---|
| 0 | 100 | 115 |
| 5 | 95 | 143 |
| 10 | 90 | 171 |
| 15 | 85 | 198 |
| 20 | 80 | 226 |
| 25 | 75 | 254 |
| 30 | 70 | 282 |
| 35 | 65 | 309 |
| 40 | 60 | 337 |
| 45 | 55 | 365 |
| 50 | 50 | 393 |

For the present example, a ferrite chemistry of about 25% lithium ferrite, and 75% magnesium manganese zinc ferrite was chosen. The mole percentages of this composition is substantially as follows: 4 mol % $Li_2O$, 20 mol % MgO, 2.3 mol % $Mn_2O_3$, 18.5 mol % ZnO, and 55.2 mol % $Fe_2O_3$. Accordingly, this composition requires substantially the following weight percentages of raw materials: 2.5% $Li_2CO_3$, 3.4% $MnO_2$, 12.8% ZnO, 6.8% MgO, and 74.5% $Fe_2O_3$.

A batch of about 3000 grams of the raw materials was weighed out according to these weight percentages. Each weighing was made to an accuracy of +/−0.01 gram. The batch was then dry mixed for 20 minutes and screened through a 20 mesh screen (850 microns) to break down any very large agglomerates in the batch.

Next, approximately 20 weight percent water was slowly added over a 20 minute period to form a damp powder. A mixer, such as a Hobart mixer, was then turned on its highest speed for another 10 minutes to intensely mix the damp powder. The powder was then pelleted into raw mix slugs approximately ¼ to ½ inch in size.

These pelleted raw mix slugs were then placed in sagger boxes and heated to about 1230 degrees Celsius in approximately 12 hours. The soak time at this temperature was about two hours. When this mixture was heated to an elevated temperature, the carbon dioxide was liberated leaving about 4.3 weight percent lithium oxide. However, a person having ordinary skill in the art will recognize that the amount of lithium oxide remaining will vary with the heating temperature and the duration of the sintering process.

The now sintered ferrite was cooled to room temperature in approximately 8 hours. The ferrite material was then crushed, such as in a Denver laboratory cone crusher, and screened through 60 mesh (250 microns). The crushed ferrite comprises a ferrite composition capable of use as a browning element of a microwave oven dish or laminate for maintaining the temperature of food cooked during operation of the microwave oven. The temperature of this exemplary ferrite composition was about 250–260 degrees Celsius.

The crushed ferrite powder can be mixed with silicone rubber using standard roll mills as currently used in the rubber industry. The silicone rubber/ferrite mix was then attached to an aluminum heat conducting dish using the process of injection molding; however, other attachment techniques such as use of adhesives may be used.

Alternatively, the crushed ferrite powder may be embedded into a disposable material for use as a microwave laminate wrap for browning food. The dish or laminate is now ready to be used in a microwave oven as a device for browning or crisping food during microwave operation.

Upon testing, it was discovered that the exemplary ferrite material has superior and unexpected properties. For example, the rate of cooking food on the above-mentioned dish is about 10% faster than with prior art microwave oven browning plates. More specifically, four separate ferrite compositions were prepared and tested. Sample 1 was prior art manganese zinc ferrite sintered and cooled in a nitrogen atmosphere, Sample 2 was manganese zinc ferrite sintered and cooled in air, Sample 3 was magnesium manganese zinc ferrite sintered and cooled in air, and Sample 4 was lithium magnesium manganese zinc ferrite according to the present invention.

Each of the four samples was mixed with 34 weight percent silicone rubber 66 weight percent ferrite and attached to the bottom of aluminum pans. Each pan was placed in the same microwave oven and heated for 15 to 20 minutes. The pans for Samples 2 and 3 did not reach above 160 degrees Celsius and were therefore not usable. The pan for Sample 1 reached 210 degrees Celsius and the pan for Sample 4 reached 230 degrees Celsius. None of the samples reached its Curie temperature, but Sample 4 using the lithium ferrite was the best performer.

It should be noted that Sample 4 had a lower temperature than the calculated Curie temperature as shown in Table 1. A reason for this is that the ferrite composition only comprises about 60% to 80% by weight of the housing with the remainder being silicone rubber. The lower the percentage of ferrite composition in the ferrite-silicone housing, the greater the difference between the operating temperature of the browning dish including the housing and the calculated ferrite composition Curie temperature. Another reason is the dissipation of heat by the plate and the ferrite housing into the microwave oven, resulting in an equilibrium temperature lower than the Curie point.

Although the above example concentrated on the use of lithium ferrite as the high Curie temperature ferrite component, a person skilled in the art could easily substitute other high Curie temperature ferrites. For example, nickel ferrite with a Curie temperature of 585 degrees Celsius, or copper ferrite with a Curie temperature of 450 degrees Celsius, could be substituted for lithium ferrite. Also, the housing may be made from materials other than silicone rubber such as high temperature plastics.

A ferrite including 25% copper ferrite and 75% magnesium manganese zinc ferrite (Curie temperature of 115 degrees Celsius) would have a calculated Curie temperature of about 200 degrees Celsius. As another example, a ferrite including 25% nickel ferrite and the same 75% magnesium manganese zinc ferrite would have a calculated Curie temperature of about 230 degrees Celsius. However, lithium ferrite is preferable since lithium ferrite is less expensive to produce and currently has an economic advantage over the other high Curie temperature ferrites.

Further, the ferrite composition of the present invention uses air atmosphere firing reducing manufacturing costs as compared to prior art manganese zinc ferrite. Moreover, a range of microwave oven plates can be easily developed having a broad spectrum of desired temperatures that cover the entire line of cooking ranges. For, example a ferrite having a higher lithium ferrite concentration would reach a higher equilibrium temperature than the disclosed example and could be used as an "extra crispy" microwave oven dish.

FIG. 1 shows a microwave oven 10 and a browning plate 12 including the ferrite composition. The microwave oven has a cavity 14 with a first sidewall 16, a second sidewall 18, a roof 20, a bottom 22, and a back wall 24. Microwaves generated from a microwave source (not shown) are supplied via a waveguide (not shown) into the cavity 14 from an opening formed in the first sidewall 16.

The browning plate 12 has an underside 26 that is provided with a layer of ferrite material. The layer covers substantially the entire underside 26 of the browning plate 12. The layer of ferrite material comprises a ferrite composition, as described in detail above, including a high Curie temperature ferrite component, such as lithium ferrite, and magnesium manganese zinc ferrite. By varying the concentration of the high Curie temperature ferrite, the Curie temperature of the layer of ferrite material can be adjusted to a preselected temperature from about 140 to about 400 degrees Celsius. The browning plate 12 is made from a heat conducting material such as aluminum. The browning plate 12 is spaced from the cavity bottom 22 a spacer such as a bottom plate or other suitable spacing structure. Preferably, the opening in side wall 16 is disposed adjacent to the space created between the bottom of the browning plate 12 and the cavity bottom 22.

FIG. 2 shows a metal browning plate 30 and a silicone rubber housing 32 including a ferrite material attached to the browning plate 30. The browning plate 30 is capable of supporting food items. The flexible silicone rubber housing 32 includes 60–80 weight percent of a ferrite composition according to the present invention. The ferrite composition may be in the form of powdered ferrite that can be embedded into the flexible rubber or plastic housing. The flexible housing may be attached to a reusable item such as a dish or plate.

FIG. 3 shows another possible embodiment of a browning plate 34 including a housing 36 inserted between two layers of metal 38 forming the plate 34. Also, the housing 36 includes the ferrite composition according to the present invention.

FIG. 4 shows a disposable system 40 such as a laminate wrap made from plastic or paper incorporating the ferrite composition 42. The ferrite composition is incorporated into a thin plastic laminate 44. This laminate 44 may then be wrapped around a food item and placed in a microwave oven. The laminate 44 consists of at least one layer including the ferrite composition 42 of this invention. The ferrite composition 42 acts as both a heat source and as a temperature control element. Preferably, the ferrite composition 42 has a particle size of 2 to 100 microns. Use of a single layer including the ferrite composition 42 has the advantage of simplified manufacturing yielding improved economies of production.

During microwave operation, magnetic losses are created by microwaves passing through the ferrite composition thereby creating heat energy. When the Curie temperature of the ferrite composition has been reached, magnetic losses generated from the ferrite composition decrease rapidly to a very low level. The temperature will then begin to decrease due to the absence of magnetic losses; however, some heat will continue to be generated due to dielectric losses. As soon as the temperature drops to a level below the preselected Curie temperature of the ferrite composition, magnetic losses will again be converted to heat from the microwave energy in the ferrite composition and the temperature of the item will again rise. This cycles continues until the microwave oven is turned off. Thus, the ferrite composition acts as a thermostat controlling the temperature of the microwave item within a desired narrow range.

A series of disposable laminates 44 can be produced having ferrites with pre-selected Curie temperatures that cover the entire temperature range applicable for cooking foods.

Although the present invention has been described in considerable detail with reference to certain preferred embodiments thereof, other embodiments are possible. Therefore, the spirit and scope of the appended claims should not be limited to the description of the preferred embodiments contained herein.

What is claimed is:

1. A ferrite composition comprising 1 to 10 mol % of a material selected from the groups consisting of $Li_2O$, NiO, CuO, SrO, BaO, 1 to 5 mol % of $Mn_2O_3$, 10 to 30 mol % of MgO, 10 to 30 mol % of ZnO, and 50 to 60 mol % of $Fe_2O_3$.

2. The ferrite composition of claim 1, wherein said material is $Li_2O$.

3. The ferrite composition of claim 2, wherein said ferrite composition comprises 1 to 8 mol % Li2O, 1 to 4 mol % Mn2O3, 15 to 25 mol % ZnO, and 50 to 60 mol % of Fe2O3, said ferrite having a Curie temperature of 140 to 400 degrees Celsius.

4. The ferrite composition of claim 2, wherein said ferrite composition comprises 2 to 5 mol % Li2O, 2 to 3 mol % Mn2O3, 18 to 22 mol % MgO, 17 to 20 mol % ZnO, and 52 to 57 mol % of Fe2O3, said ferrite having a Curie temperature of 200 to 300 degrees Celsius.

5. The ferrite composition of claim 1, wherein said ferrite has a Curie temperature of about 140–400 degrees Celsius.

6. A method of producing a ferrite material comprising the steps of:

(a) combining a first ferrite component comprising a soft ferrite material comprising manganese zinc ferrite with a second ferrite component selected from the group consisting of lithium ferrite, copper ferrite, magnesium ferrite, strontium ferrite, and magnesium manganese ferrite to form a mixture; and sintering said mixture to produce the ferrite material.

7. A method of producing a ferrite material for use with a microwave browning dish comprising the steps of:

mixing raw materials of iron oxide, magnesium oxide, zinc oxide, manganese oxide, and lithium carbonate forming a mixture;

reducing particles in said mixture to form a sized reduced mixture sintering said sized reduced mixture to form a sintered ferrite powder; and crushing said sintered ferrite powder forming a crushed ferrite powder.

8. A ferrite composition comprising 1 to 10 mol % of a material selected from the groups consisting of nickel oxide, copper oxide, strontium oxide, and barium oxide, 1 to 5 mol % of manganese oxide, 10 to 30 mol % of magnesium oxide, 10 to 30 mol % of zinc oxide and about 50–60 mol % of iron oxide.

9. A method of making a microwave browning dish comprising the steps of:

mixing raw materials of iron oxide, magnesium oxide, zinc oxide, manganese oxide, and lithium carbonate forming a mixture;

reducing particles in said mixture to form a size reduced mixture;

sintering said sized reduced mixture to form a sintered ferrite powder;

crushing said sintered ferrite powder forming a crushed ferrite powder; and incorporating said crushed ferrite powder with the microwave browning dish.

* * * * *

UNITED STATES PATENT AND TRADEMARK OFFICE

CERTIFICATE OF CORRECTION

PATENT NO. : 5,665,819
DATED : September 9, 1997
INVENTOR(S) : Rudolf K. Tenzer

It is certified that error appears in the above-identified patent and that said Letters Patent is hereby corrected as shown below:

Coumn 2,
Line 27, please delete "5 mol% $Li_2o2$" and insert -- 5 mol %$Li_2o$, 2 -- .
Line 45, please delete "$Mn_2o3$" and insert -- $Mn_2o_3$ -- .

Claim 3,
Line 2, please delete "Li20" and insert -- $Li_20$ --.
Line 3, please delete "Fe203," and insert Mn203, Signed and Sealed this Twenty-eighth Day of August, 2001

*Attest:*

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : 5,665,819
DATED : September 9, 1997
INVENTOR(S) : Rudolf K. Tenzer

It is certified that error appears in the above-identified patent and that said Letters Patent is hereby corrected as shown below:

Column 2,
Line 27, please delete "5 mol% $Li_2o2$" and insert -- 5 mol %$Li_2o$, 2 -- .
Line 45, please delete "$Mn_2o3$" and insert -- $Mn_2o_3$ -- .

Claim 3,
Line 2, please delete "Li20" and insert -- $Li_20$ --.
Line 3, please delete "Mn203," and insert -- Mn2O3, 15-25 mol %MgO, -- .
Line 3, please delete "Fe203" and insert -- $Fe_2O_3$ -- .

Claim 4,
Line 2, please delete "Li2O" and insert --$Li_2O$ --.
Line 3, please delete Mn3O3, and insert --$Mn_2O_3$, --.
Line 4, please delete "Fe2O3" and insert -- $Fe_2O_3$ --.

Claim 6,
Line 9, please delete "sintering said" and insert -- (b) sintering said --.

Claim 7,
Line 7, please delete "mixture sintering" and insert -- mixture; sintering --.

This certificate supersedes certificate of correction issued August 28, 2001.

Signed and Sealed this

Eighteenth Day of December, 2001

*Attest:*

JAMES E. ROGAN

*Attesting Officer*

*Director of the United States Patent and Trademark Office*